(12) United States Patent
Guttman et al.

(10) Patent No.: US 6,366,918 B1
(45) Date of Patent: Apr. 2, 2002

(54) COMPUTER-IMPLEMENTED OPTIMIZATION OF PUBLICATION LAYOUTS

(75) Inventors: William L. Guttman, Cave Rock; Francis E. Stock, Stateline, both of NV (US)

(73) Assignee: Nth Degree Software, Inc., Bellevue, WA (US)

( * ) Notice: Subject to any disclaimer, the term of this patent is extended or adjusted under 35 U.S.C. 154(b) by 0 days.

(21) Appl. No.: 09/532,032

(22) Filed: Mar. 21, 2000

Related U.S. Application Data

(63) Continuation of application No. 08/808,079, filed on Feb. 28, 1997.
(60) Provisional application No. 60/012,697, filed on Feb. 29, 1996.

(51) Int. Cl.[7] .......................... G06F 17/30; G06F 15/00
(52) U.S. Cl. ....................... 707/100; 707/102; 707/517; 707/530
(58) Field of Search .................................. 707/530, 100, 707/12, 531, 525, 517; 364/512; 353/121

(56) References Cited

U.S. PATENT DOCUMENTS

| | | | |
|---|---|---|---|
| 3,645,613 A | | 2/1972 | Brink et al. ............... 353/121 |
| 3,668,685 A | | 6/1972 | Horvath ...................... 340/324 |
| 4,697,242 A | | 9/1987 | Holland et al. ............. 364/513 |
| 4,881,178 A | | 11/1989 | Holland et al. ............. 364/513 |
| 5,136,686 A | | 8/1992 | Koza ........................... 706/13 |
| 5,181,162 A | | 1/1993 | Smith et al. ................ 364/419 |
| 5,295,236 A | * | 3/1994 | Bjorge et al. ............... 345/434 |
| 5,343,554 A | | 8/1994 | Koza et al. .................. 706/13 |
| 5,390,354 A | * | 2/1995 | de Heus et al. ............ 707/517 |
| 5,434,961 A | | 7/1995 | Horiuchi et al. ............ 455/3.2 |
| 5,438,512 A | * | 8/1995 | Mantha et al. .............. 707/517 |
| 5,666,543 A | * | 9/1997 | Gartland ..................... 707/521 |
| 5,708,960 A | | 1/1998 | Kamisaka et al. .......... 455/3.2 |
| 5,774,363 A | | 6/1998 | Sato et al. ................... 700/97 |
| 5,860,073 A | | 1/1999 | Ferrel et al. ................ 707/522 |
| 5,870,552 A | | 2/1999 | Dozier et al. ............... 709/219 |
| 5,911,146 A | | 6/1999 | Johari et al. ................ 707/525 |
| 5,953,733 A | | 9/1999 | Langford-Wilson ......... 707/517 |
| 6,052,514 A | * | 4/2000 | Gill et al. .................... 345/331 |

OTHER PUBLICATIONS

Holland, John H. Adaptation in Natural and Artificial Systems: An Introductory Analysis with Applications to Biology, Control, and Artificial Intelligence, third printing, 1994, First MIT Press Edition, 1992, ©1992 Massachusetts Institute of Technology. (see entire book: pp 1–211).

Goldberg, David E., Genetic Algorithms in Search, Optimization & Machine Learning, ©1989 by Addison–Wesley Publishing Company, Inc. (see entire book: pp 1–412).

Impoze™: Quick Guide to 61A, Jan., 1995, The Parnau Group, Inc., Mukwonago, WI, (see entire document: 9–pages).

Page Director® Series, "The Bottom Line", (Editorial, Advertising and Classified), Managing Editor Software, Inc., ©1994, (see entire document: 15–pages).

"Two set of experts to help you do it right", Graphix and Informatel, the Whole Scale of Software for Publishers!, advertisement ©1994, (1–page).

PageXpert™, Ultra Corporation, ©1993 Digital Multimedia Productions, Inc., advertisement (2–pages).

* cited by examiner

Primary Examiner—Hosain T. Alam
Assistant Examiner—Ella Colbert

(57) ABSTRACT

A computer-implemented method, apparatus, and article of manufacture optimizes publication layouts using a genetic algorithm approach. In a timely manner, the computer-implemented invention generates and evaluates a large number of publication layouts and selects the optimum layout. The optimal layout has an optimal relationship between the placement of advertisements and stories on the pages of the publication, the maximization of revenues, and the minimization of printing costs.

9 Claims, 14 Drawing Sheets

COMPUTER-IMPLEMENTED OPTIMIZATION OF PUBLICATION LAYOUTS

CROSS-REFERENCE TO RELATED APPLICATIONS

This application is a Continuation of application Ser. No. 08/808,079, filed Feb. 28, 1997, entitled "COMPUTER-IMPLEMENTED OPTIMIZATION OF PUBLICATION LAYOUTS", which application is incorporated herein by reference.

This patent application claims the benefit under 35 U.S.C. § 119(e) of commonly assigned and provisional patent application Ser. No. 60/012,697, filed Feb. 29, 1996, by William L. Guttman and Francis E. Stock, entitled "COMPUTER-IMPLEMENTED OPTIMIZATION OF PUBLICATION LAYOUTS", which application is incorporated by reference herein.

BACKGROUND OF THE INVENTION

1. Field of Invention

The present invention generally relates to a computer-implemented invention for producing publication layouts, and in particular, to a computer-implemented invention for optimizing publication layouts.

2. Description of Related Art

In the prior art, a publication layout is typically created with minimal computer support. Generally, computers are used to assist only in placing advertisements or editorials on a specific page. A number of problems are associated with such minimal support, including the inability to create an optimal relationship between advertisements and editorials, and the inability to maximize revenues.

An optimal relationship is established when a publication layout satisfies advertisers' requirements and produces the lowest possible printing costs. Typically, publishers spend a considerable amount of time evaluating both advertiser and editorial requirements, and determining the most cost-effective configuration. This detailed analysis involves generating several mock-ups or "dummys" of the layout creating different revenues and costs, before a final layout is produced. Printing deadlines prevent the publisher from creating all possible layouts and selecting the optimal arrangement. Consequently, publishers only review a designated number of layout configurations. Thus, the likelihood of one of these layouts resembling an optimum arrangement is small.

Furthermore, since publishers are limited to evaluating a small number of layouts, they lack the comparative information necessary to maximize revenue and minimize cost. In fact, without reviewing a large number of layouts, they can only speculate about whether a particular layout provides maximum revenue and/or minimum cost.

Thus, there is a need in the publishing industry for a comprehensive publication layout system that can resolve the above concerns.

SUMMARY OF THE INVENTION

To overcome the limitations in the prior art described above, and to overcome other limitations that will become apparent upon reading and understanding the present specification, the present invention discloses a computer-implemented method, apparatus, and article of manufacture for optimizing publication layouts. More specifically, the present invention uses a genetic algorithm approach to produce the optimized publication layouts. In a timely manner, the invention generates and evaluates a large number of possible layouts and selects the optimum layout. The optimal layout has an optimal relationship between the placement of advertisements and editorials on the pages of the publication, in terms of the maximization of revenues and the minimization of costs.

The capabilities of the present invention provide a comprehensive electronic publication layout system that automates and enhances the publication layout process. While the invention primarily facilitates the process of deciding what advertisements and editorials fall on which pages, it also has the ability to optimize layouts taking into account constraints such as copy specifications (e.g. size, shape, color, and sections), prioritized positioning requirements, and copy factors impacting positions (e.g. half-page spreads, reader service number, coupon positioning, bleed edges), and production specifications (e.g. whether four-color is available, whether the page falls on a section break, and what edition a page falls in).

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
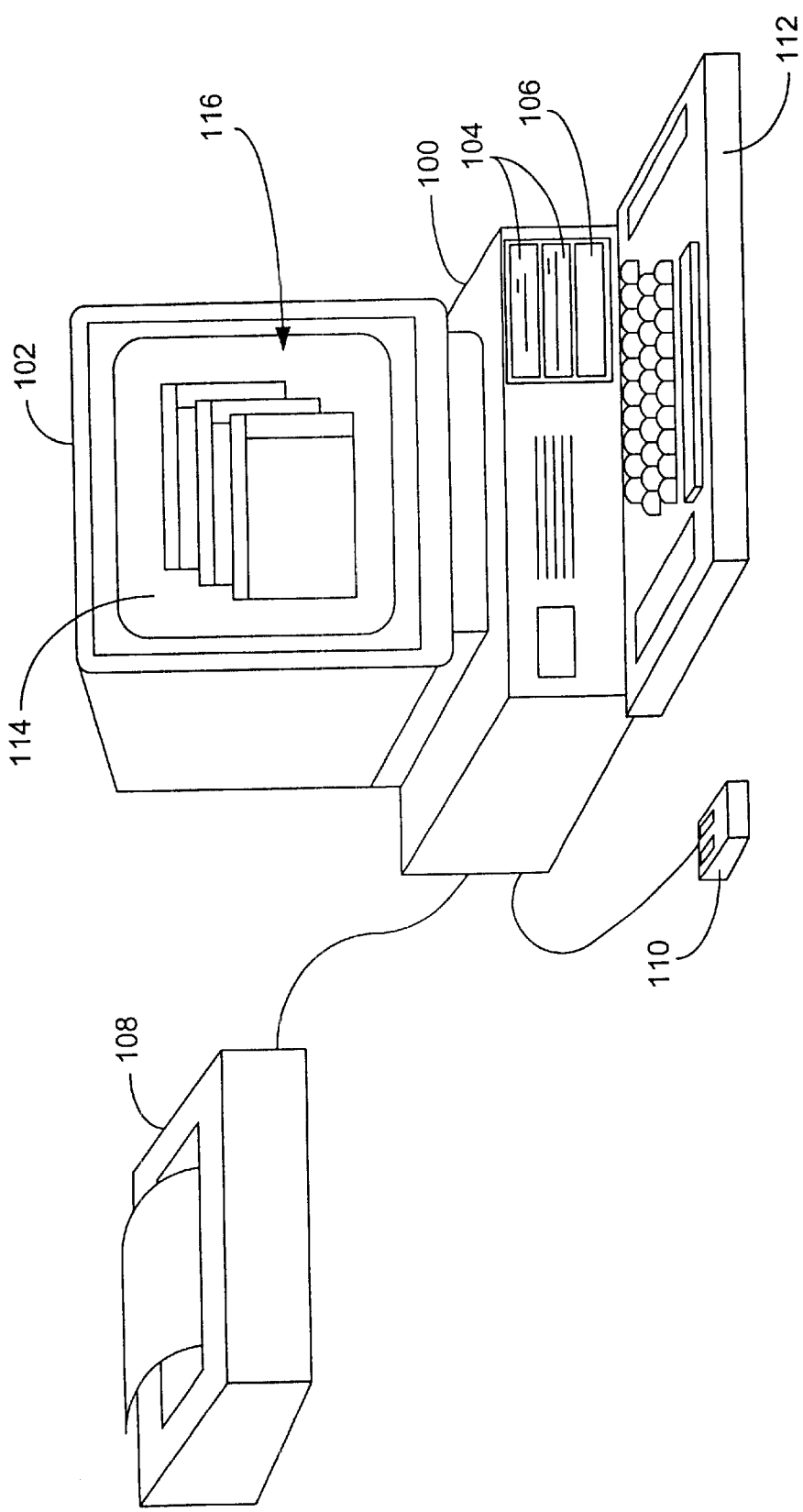
FIG. 1 is a block diagram that illustrates an exemplary hardware environment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention comprises a computer-implemented method, apparatus, and article of manufacture for optimizing publication layouts. More specifically, the present invention uses a genetic algorithm approach to produce the optimized publication layouts. In a timely manner, the invention generates and evaluates a large number of possible layouts and selects the optimum layout. The optimal layout has an optimal relationship between the placement of advertisements and editorials on the pages of the publication resulting in a maximization of revenue and a minimization of costs.

The present invention uses both advertising and editorial information to produce an optimal publication layout. It balances advertiser and editorial requirements and determines the most cost-effective configuration for each publication. Specifically, it optimizes advertising positioning for clients, checks that all placement requirements are met, and automatically determines the manufacturing cost of each issue.

In its preferred embodiment, the computer-implemented method, apparatus, and article of manufacture of the present invention has both automatic and manual modes. The automatic mode uses various built-in strategies and optimizations to automatically place items (advertisements, editorials, signatures, etc.) onto the layout. The strategies allow for conflict-free placement of advertisements and editorial content, and the optimizations minimize production costs. In the automatic mode, the present invention automatically estimates package sizes from advertisement and editorial specifications. Further, the present invention attempts to include aesthetic constraint considerations, such as proper distribution of color pages and the proper distribution of advertisements and editorials. As a result, the automatic mode may produce several different layouts for the same publication with potentially varying costs.

Unlike the automatic mode, the manual mode allows the user to manually place advertisements and editorials. The user defines the package size, color page requirements, and other publication specifications. The present invention continually detects placement conflicts and advises users of these conflicts. To resolve conflicts, the user may modify an item's constraints or reposition the item. The user may also choose to ignore such conflicts. After such modifications, the present invention can determine if the rearrangement requires wasteful make-goods because advertisers requirements are not met. In addition, the present invention prevents the user from making changes that produce unrealistic layouts (like placing two identical advertisements on the same page).

A primary feature of the present invention includes the estimation and minimization of production costs. In both the automatic mode and manual mode, cost calculations are based on form costs, printer web configurations, bindery requirements, etc. Cost minimization is achieved by optimal form choice, optimal signature pairing, correct web closure, etc. The present invention is also capable of using circulation numbers to estimate production costs. As a result, the present invention is capable of estimating cost on a regional basis, evaluating regionally constrained advertisements, editorials, and inserts.

In the automatic mode, the present invention directly performs an optimization step to minimize costs. In particular, it reviews all the positioning requirements and automatically selects the most inexpensive configuration based on printing rates.

In the manual mode, the present invention provides the user with various aids to achieve cost minimization. For example, the user can create multiple layouts for the same publication, thereby allowing the user to obtain different costs for different layouts.

Other features of the present invention include a user friendly interface, interfaces with external client databases, report generation, and conflict resolution.

With regard to the user friendly interface, both the automatic mode and the manual mode are intuitive and easy to manipulate. The present invention provides an extensive graphical user interface in the form of menu driven command interfaces, dialog driven command interfaces, dialog driven data entry interface, drag and drop behavior functionality, tool pallet functions, and multiple document views. The interface provides access to a single spread view and a full-book view, allowing the user to do a side-by-side comparison of different versions. In addition, the graphical interface is used to facilitate conflict resolution and constraint modification in the manual mode.

With regard to interfaces with external client databases, the present invention can accept various input data to support the publication layout process, such as publication specifications, advertisements and editorial specifications in terms of sizes, placement constraints, and press descriptions. The present invention can also accept other data describing the publication's content and the production environment including data from Quark Publishing System, Admate, Team Publisher, Datatrax, and more.

With regard to report generation, the present invention provides utilities to allow users to generate various reports such as a layout description, press layout forms, advertisements, editorial placement descriptions, run down sheets, bindery information, and shipping information. The user may also specify any other necessary reports. The invention allows for the generation of text as well as graphic hard copy reports. Further, the invention allows reports and data to be exported to other applications.

HARDWARE ENVIRONMENT

FIG. 1 is a block diagram that illustrates an exemplary hardware environment of the present invention. The present invention is typically implemented using a personal computer 100 or workstation, such as a Power Macintosh™ computer. It is envisioned that attached to the personal computer 100 may be a monitor 102, hard and/or floppy disk drives 104, CD-ROM drives 106, and printer 108 peripherals. Also included in the preferred embodiment may be input devices, for example, a mouse pointing device 110 and a keyboard 112.

In addition, the personal computer 100 operates under the control of a operating system 114 represented in FIG. 1 by the screen display on the monitor 102. The present invention preferably comprises one or more computer programs 116, represented in FIG. 1 by the "windows" displayed on the monitor 102, operating under the control of the operating system 114. Generally, the computer programs 116 are tangibly embodied in an article of manufacture, i.e., a computer-readable carrier or medium, such as one or more of the fixed and/or removable data storage devices 104 and 106. Under control of the operating system 114, the computer program 116 may be loaded from the data storage devices 104 and/or 106 into the memory of the computer 100. The computer program 116 comprises instructions which, when read and executed by the computer 100, causes the computer 100 to perform the steps necessary to execute the steps or elements of the present invention.

DATABASE

Figure 2A:
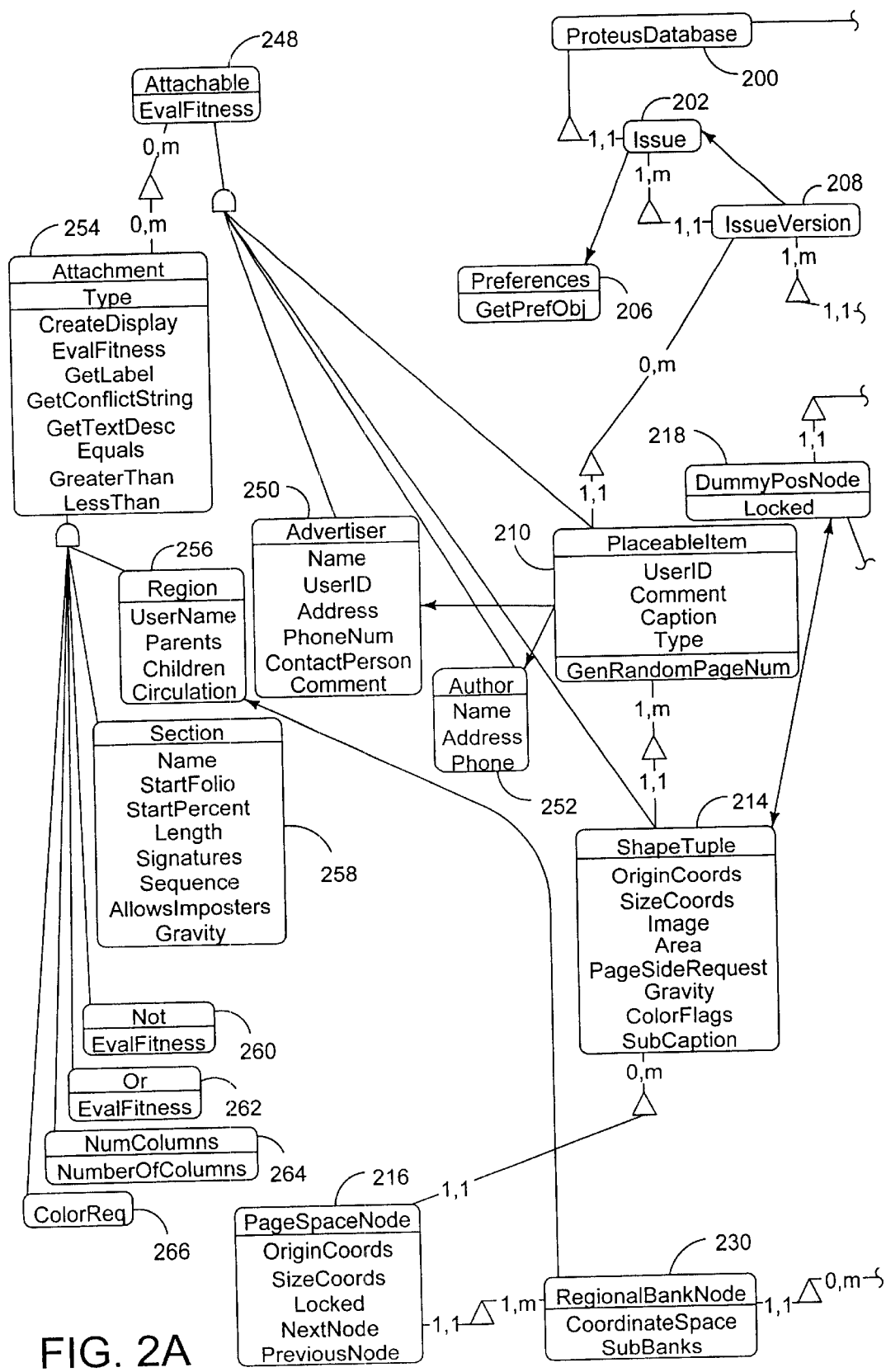
FIGS. 2A–2B together is a block diagram illustrating the data structures stored in the memory of the computer that are used in the present invention.
Figure 2B:
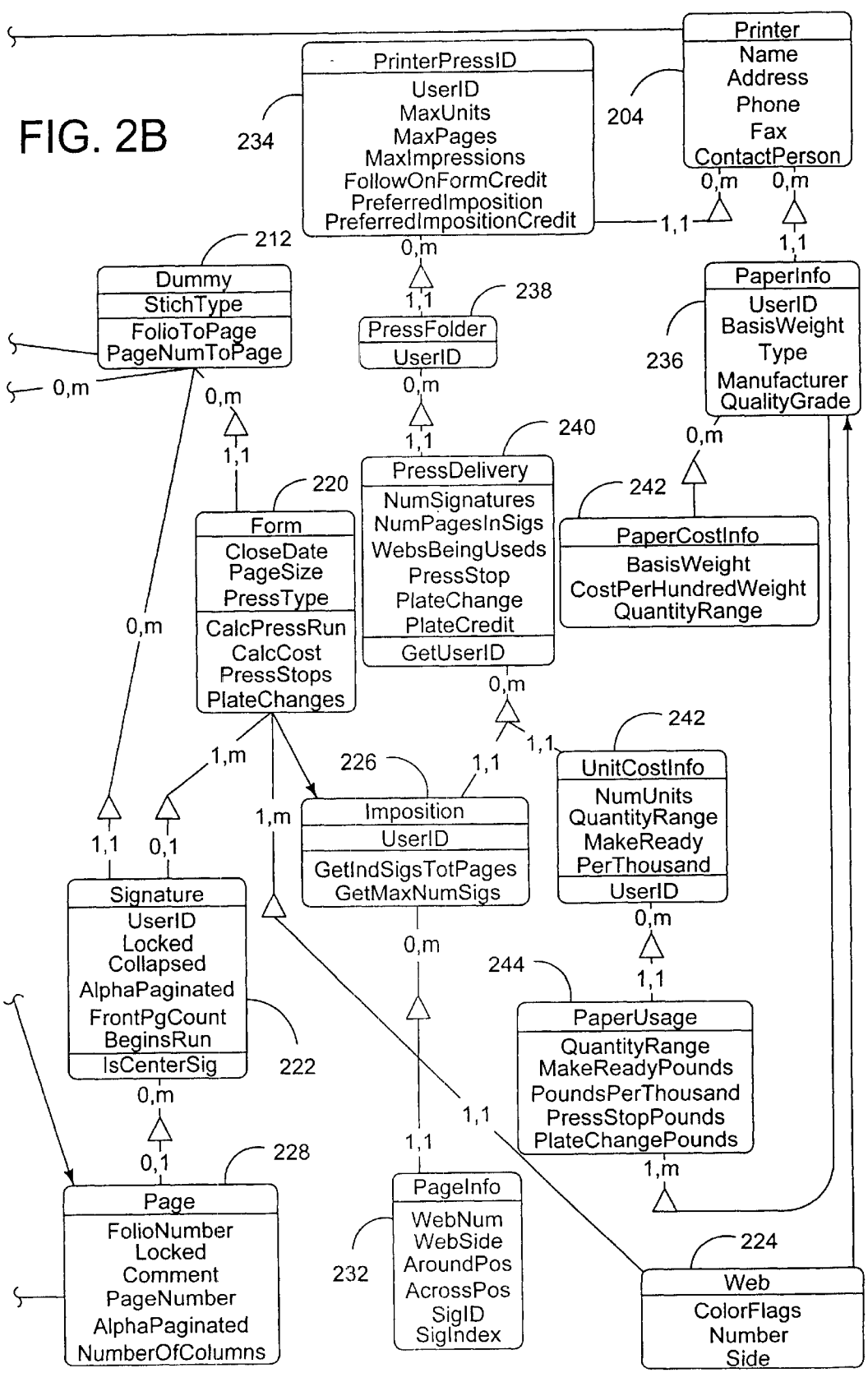

FIGS. 2A–2B together is a block diagram illustrating the elements of a database stored in the memory of the computer 100 according to the present invention. The block diagram conforms to the COAD-Yourdon style of object-oriented design and illustration. Those skilled in the art will recognize that these example data structures are not intended to imply any specific functional or structural limitations, and that other similar structures could be used to accomplish the present invention.

The elements of the database illustrated in FIGS. 2A–2B are object-oriented as indicated by the blocks, and the objects are linked by relationships indicated by the lines between the blocks in the diagram. Each of the blocks represents binary data stored in the database in a discrete data structure. The crescent shapes in the diagram denote inheritance, wherein the subordinate objects below the crescent inherit the functions, attributes and characteristics of the superior object above the crescent. The triangles in the diagram denote whole-part objects, wherein the subordinate object below the triangle is a part of the superior object above the triangle. The legends on the lines between objects indicate how many of the subordinate objects may be found within the superior object. For example, a "1,1" legend below the triangle indicates that the subordinate object below the legend can be found in one and only one superior object above the triangle. A "1,m" legend or "0,m" legend above the triangle indicates that 0 or 1 to many of the subordinate objects below the triangle can be found in the superior object above the triangle. The lines with arrows indicate a relationship generally indicated through an attribute or characteristic of the objects. Most of the power of the domain for the present invention resides in the relationships between the various objects.

The database 200 is comprised of Issue objects 202 and Printer objects 204, wherein the Issue objects 202 comprise an entire publication layout and the Printer objects 204 comprise the printing specifications.

The Issue objects reference a Preferences object 206. In addition, the Issue objects 202 are made up of one or more IssueVersion objects 208 and each IssueVersion object 208 is comprised of both PlaceableItem objects 210 and Dummy objects 212.

The PlaceableItem objects 210 comprise the information, editorial, advertising, and/or inserts, that is imported into the system from other systems. Each of the PlaceableItem objects 210 comprises a sequence of one or more pages of advertising, editorial, and/or insert material, and/or sub-parts thereof, wherein a number of attributes are defined for the items. All of the PlaceableItem objects 210 for a publication are interconnected as an ordered list, generally a linked list that provides an order to the objects 210.

Each PlaceableItem object 210 has characteristics or variables associated therewith, including UserID, Comment, Caption, and Type. It also has an operation that can be performed on the PlaceableItem object 210, e.g., Generate Random Page Number (GenRandomPageNum). The PlaceableItem objects 210 are comprised of one or more ShapeTuple objects 214.

The ShapeTuple objects 214 represent the physical layout of the PlaceableItem object 210 upon the page, including Origin Coordinates, Size Coordinates, Image, Area, PageSideRequest, Gravity, ColorFlags, and SubCaption. In turn, the ShapeTuple objects 214 are comprised of zero or more PageSpaceNode objects 216.

When an item is placed on a page in a layout, a PageSpaceNode object 216 is created for that page that represents the coordinate space occupied by the PlaceableItem object 210 on the page. When an item is removed from a page, the PageSpaceNode object 216 is deleted.

A DummyPositionNode object 218 is created when an insert is placed, rather than a PageSpaceNode object 216, because an insert does not occupy a page. A reference page identifies the insert's location within the Dummy object 212, but they belong to the Dummy 212 and not the page.

The Dummy objects 212 represent a proposed layout for the publication. The Dummy object 212 is comprised of zero or more DummyPositionNode objects 218, Form objects 220, and Signature objects 222. The Form object 220 is comprised of Signature objects 222, Web objects 224, and Imposition objects 226. The Signature object 222 is comprised of zero or more Page objects 228. The Page object 228 is comprised of zero or more RegionalBankNode objects 230, which in turn are comprised of one or more PageSpaceNode objects 216. The Imposition object 226 is comprised of zero or more PageInfo objects 232.

The Printer objects 204 are compared to the Issue objects 202 to determine cost calculations. The Printer objects 204 represent printing information that helps the present invention to determine the cost of any particular publication layout. The Printer object 204 is comprised of zero or more PrinterPressID objects 234 and zero or more PaperInfo objects 236. Each PrinterPressID object 234 is comprised of zero or more PressFolder objects 238, which in turn are comprised of zero or more PressDelivery objects 240. The PressDelivery objects 240 is comprised zero or more Imposition objects 226 and zero or more UnitCostInfo objects 242. The UnitCostInfo object 242 is comprised of zero or more PaperUsage objects 244, which in turn is comprised of one or more PaperInfo objects 236. The PaperInfo object 236 is comprised of zero or more PaperCostInfo objects 246.

The Attachable object 248 is comprised of zero or many Attachment objects 254. The PlaceableItem object 210, ShapeTuple object 214, Advertiser object 250 and Author object 252 inherit attributes, functions and characteristics from the Attachable object 248. A number of other objects, including Region objects 256, Section objects 258, Not objects 260 or Objects 262 NumColumns objects 264 and ColorReq objects 266 also inherit the characteristics, attributes and functions of the Attachable object 254.

An object that inherits the characteristics, attributes and functions of the Attachable object 248 may have characteristics, attributes or functions attached to it. For example, a Section object 258 may be attached to a PlaceableItem object 210, to indicate what section of the magazine receives the PlaceableItem object 210. Only the basic attachments are shown in this diagram, but the present invention is capable of having an unlimited number of attachments, including new attachments not defined herein.

AUTOMAKEUP FUNCTION

The AutoMakeup function, which is discussed in more detail below in the Optimization section, automatically generates and optimizes the publication layout. The Automakeup function comprises the process of taking PlaceableItem objects 210 and placing them in the Dummy object 212, using the interrelated ShapeTuple objects 214, PageSpaceNode objects 216, RegionalBankNode objects 230, Page objects 228, Signature objects 222, Form objects 220.

To automatically create a publication layout, the following steps are performed by the operator using the computer 100: (1) create an Issue Version as objects 202, 208, 206, and 212; (2) import (or enter) the Editorial, Advertising, and Insert items as PlaceableItem objects 210 into the database 200; and (3) invoke the AutoMakeup function. Two modes of operation are available for the Automakeup function:

speed and precision. The former places a version quickly, but may not provide a sufficiently tight package or eliminate enough conflicts to satisfy the user's needs. The latter will provide a much better fit with the user's requirements, but will take substantially longer to complete the job, especially for large or complex packages.

OPTIMIZATION

In the present invention, optimization of the publication comprises at least three steps. First, the invention creates a publication layout data structure, i.e., Dummy object 212, in the memory of the computer representing the publication layout, wherein the layout data structure is further comprised of objects and attributes. Second, the invention creates one or more item data structure, i.e., PlaceableItem object 210, in the memory of the computer 100 representing editorial, advertising, and inserts to be placed in the publication layout, wherein the item data structures are further comprised of objects and attributes. Finally, the invention optimizes, in the memory of the computer 100, the placement of the editorial, advertising and inserts in the publication layout using a biological programming model, such as a computer-implemented recombinant algorithm, a computer-implemented evolution algorithm, or a computer-implemented genetic algorithm. This optimizing step considers the attributes of the publication layout, editorial, advertising and inserts, and providing an optimal mix of the attributes for the publication layout, editorial, advertising and inserts.

Figure 3:
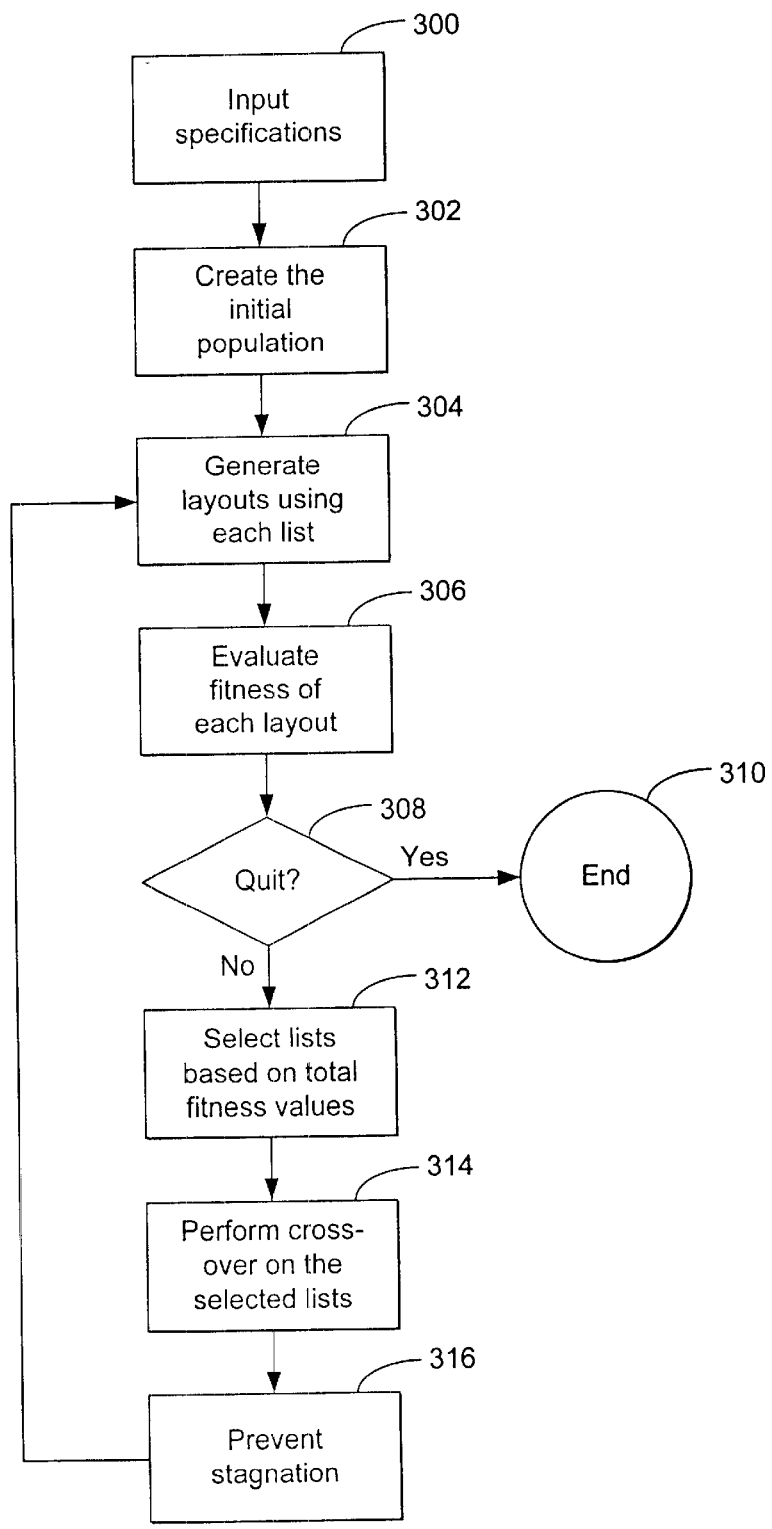
FIG. 3 is a flowchart illustrating one possible embodiment of the optimization logic according to the present invention.

FIG. 3 is a flowchart illustrating one possible embodiment of the optimization logic according to the present invention. Those skilled in the art will recognize that this example logic is not intended to imply any specific functional limits, and that other similar logic could be used to accomplish the present invention.

Block 300 represents the computer 100 prompting for the entry of user input, wherein the user input comprises various elements of the database 200 shown in FIG. 2.

Block 302 represents the computer 100 randomly generating an initial population of a plurality of ordered lists in the memory of the computer 100, wherein each of the ordered lists comprise a different ordered sequence of the PlaceableItem objects 210 in the database 200. Each of the ordered lists in the random population is comprised of the same PlaceableItem objects, only in different ordered sequences.

The population may comprise an unlimited number of ordered lists, but generally some limit is set on the number of lists. On the other hand, the more permutations of an ordered list that are available, the more placements can be done, and the higher the likelihood of finding an optimal layout. Multi-processor systems are ideal for performing the optimization techniques of the present invention, because each of the processors could process its own population or individuals within the population at the same time as the other processors. In practical terms, however, larger populations mean longer processing times, and thus it is likely that smaller populations can more quickly find a suitably optimal solution.

Figure 5:
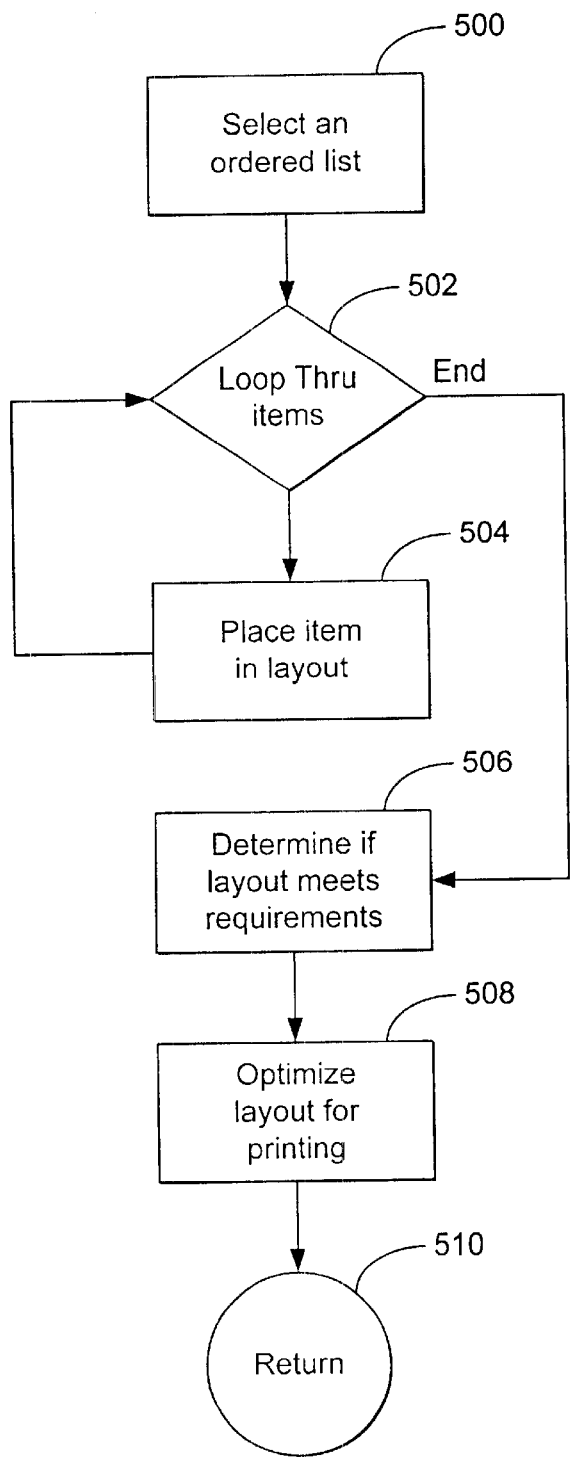
FIG. 5 is a flowchart illustrating the placement function according to the present invention.

Block 304 represents the computer 100 generating a publication layout from each of the ordered lists in the layout, wherein the publication layout is optimized based on meeting the requirements of the PlaceableItem objects 210 and the Dummy objects 212. Refer to FIG. 5 for a flowchart further illustrating the steps involved in this function. When each of the ordered lists in the population is processed by this step, a different publication layout is generated.

Block 306 represents the computer 100 evaluating the fitness of the different publication layouts. As indicated above, each of the ordered list in the population comprises the same PlaceableItem objects 210, but in different orders, and the Dummy objects 212 are evaluated depending whether or not all the PlaceableItem objects 210 in the ordered list can be placed in the publication layout with the attributes of both the PlaceableItem objects 210 and the Dummy objects 212 satisfied. The evaluation of the publication layout represented by the Dummy object 212 comprises an aggregation of the fitness values for each individual PlaceableItem object 210 in the list. Also included in the evaluation is a calculation to determine how much it would cost to print each layout. Further, the evaluation includes an analysis of the aesthetics of the layout. These various criteria are then combined into a total fitness value for the specific ordered list.

Block 308 is a decision block that represents the computer 100 determining whether to terminate the optimization process, because an optimal layout has been produced, or because an operator terminates the process. An optimal layout is a layout that satisfies advertisers' requirements, maximizes revenues, and minimizes costs. If the answer is "yes", then control transfers to Block 310 to end the process; otherwise, control transfers to Block 312. Block 310 also may represent the computer 100 displaying the results or printing the results, wherein the results represent either the current population or an optimal layout.

Blocks 312–316 (and then returning to Blocks 304–310) illustrate the iterative optimization performed by the computer 100. However, the iteration first requires that the population of ordered lists "evolve" into a new generation of offspring.

Block 312 represents the computer 100 selecting a subset of the ordered lists from the population based on the total fitness values. Preferably, the selection technique is stochastic selection, also known as roulette wheel selection, which is well known in the art. The selection technique generally has the effect of selecting the most fit individual lists for survival into the next generation.

Block 314 represents the computer 100 performing a cross-over function on the selected lists. In genetic algorithms, new offspring are bred from individuals of past populations. When the evolved ordered lists are created and propagated into a new generation, the original ordered lists are discarded.

In the preferred embodiment, the computer 100 generates two random numbers from between 1 and the total size of the population, avoiding the same number twice, and performs the cross-over technique with the ordered lists identified by the two numbers. In an alternative embodiment, the computer 100 performs the cross-over technique using pairs of remaining ordered lists having the highest probabilities based on their total fitness values, so that those ordered lists with the highest fitness levels are used more often than will those ordered lists with lower fitness values.

In the present invention, a cyclic cross-over function, which is well known in the art, is used to combine pairs of the ordered lists to create new lists. Of course, those skilled in the art will recognize that any number of crossover functions may be used without departing from the scope of the present invention. In addition, the cross-over may produce invalid lists, i.e. lists containing duplicate items or lists omitting items. Consequently, Block 314 represents a cross-over function involving controlled changes to prevent such invalid lists.

Figure 4A:
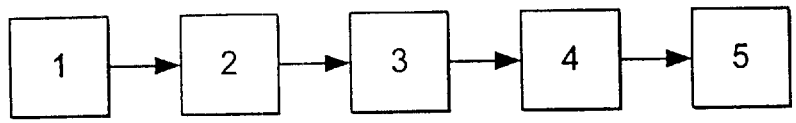
FIG. 4A is a block diagram illustrating one possible result from the cross-over function.
Figure 4A:
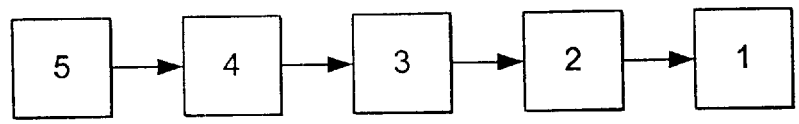
Figure 4B:
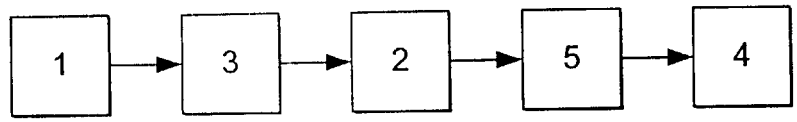
FIG. 4B represents the new offspring created from the lists of FIG. 4A.
Figure 4B:
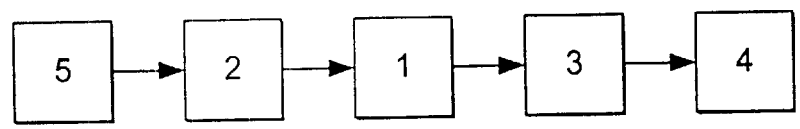

FIGS. 4A and 4B are block diagrams that illustrate one possible result from the cross-over function. In FIG. 4A, list #1 is comprised of PlaceableItem objects 210 ordered as indicated by the numbers within the blocks (i.e., 1, 2, 3, 4, 5), and list #2 is comprised of PlaceableItem objects 210 ordered as indicated by the numbers within the blocks (i.e., 5, 4, 3, 2, 1). The cross-over function combines the attributes of two ordered lists to produce a new offspring, i.e. an "evolved" list. In FIG. 4B, the new offspring created from the lists of FIG. 4A are shown, wherein list #1 is comprised of PlaceableItem objects 210 ordered as indicated by the numbers within the blocks (i.e., 1, 3, 2, 5, 4), and list #2 is comprised of PlaceableItem objects 210 ordered as indicated by the numbers within the blocks (i.e., 5, 2, 1, 3, 4). Of course, those skilled in the art will recognize that other combinations may also be created, and that the illustrated offspring are merely exemplary of the results of the cross-over function.

Referring again to FIG. 3, Block 316 represents the computer 100 preventing stagnation when the population congregates about a "local" (as opposed to global) optimal solution. The computer 100 avoids such stagnation in an attempt to find the most optimal ordered list. Such techniques are well known in the art and thus not described further herein.

After Block 316, control is transferred to Block 306, which represents the computer 100 repeating the steps of Blocks 304–308 (and possibly 312–316) until an optimal layout is produced, or until an operator terminates the process at Block 308.

PLACEMENT

FIG. 5 is a flowchart illustrating the placement function according to the present invention. Those skilled in the art will recognize that the logic illustrated is not intended to imply any specific functional limits, and that other similar logic could be used to accomplish the present invention.

Block 500 represents the computer 100 selecting one of the ordered lists for placement in the publication layout, wherein the function is invoked at Block 304 in FIG. 3 by the computer 100 generating a publication layout from each of the ordered lists.

Block 502 is a decision block that represents the computer 100 looping through all the PlaceableItem objects 210 in the list. As indicated above, each PlaceableItem object 210 in the list may comprise editorial, advertising or insert information, and attributes relating thereto. Further, each of the PlaceableItem objects 210 can be less than a page, a full page, or multiple pages.

Block 504 represents the computer 100 placing the next PlaceableItem object 210 from the list in the publication layout. Such placement occurs by associating the PlaceableItem object 210 with the pages in the Dummy object 212, which represents the publication layout, using the interrelated ShapeTuple objects 214, PageSpaceNode objects 216, RegionalBankNode objects 230, Page objects 228, Signature objects 222, Form objects 220. There are two, and possibly more, techniques for performing such placement.

In a preferred embodiment, each PlaceableItem object 210 from the ordered list is placed in the publication layout in turn, beginning with the first PlaceableItem object 210 in the ordered list, which is placed on the first page of the publication layout. The remaining PlaceableItem objects 210 from the ordered list are placed on pages in the publication layout beginning from the first page and working backward to the last page of the publication layout.

In an alternative embodiment, each PlaceableItem object 210 from the ordered list is placed in the publication layout in turn, beginning with the first PlaceableItem object 210 in the ordered list, which is placed on the page representing the "center" location of the publication layout. The remaining PlaceableItem objects 210 from the ordered list are placed on pages in the publication layout beginning from the center location and working outward to the two end pages of the publication layout (i.e., the first and last pages). The placement is done in such a manner that both "halves" of the publication layout remain as closely balanced as possible, in terms of the PlaceableItem objects 210 of the ordered list associated therewith, or alternatively, in terms of the number of filled pages in the publication layout represented by such placement. The goal of this placement method is to balance the placement of PlaceableItem objects 210 from the ordered lists about the center of the publication layout.

Placement continues from Blocks 502-504 until all the PlaceableItem objects from the ordered list have been placed in the publication layout.

Once placement is completed for all the PlaceableItem objects in the ordered list, Block 506 represents the computer 100 determining if the layout meets the publisher's form requirements, as represented in the database 200. This includes requirements such as pricing, printing the publication, etc.

Block 508 represents the computer 100 optimizing the layout for printing.

Block 510 represents the termination of the logic.

ITEM PLACEMENT

FIGS. 6A, 6B, 6C, and 6D together are a flow chart illustrating the item placement function according to the present invention. Those skilled in the art will recognize that this example logic is not intended to imply any specific functional limits, and that other similar logic could be used to accomplish the present invention.

Block 600 represents the start of the logic, wherein the function is invoked at Block 504 in FIG. 5.

Block 602 represents the computer 100 retrieving the first ShapeTuple object 214 for the PlaceableItem object 210 and setting the working space to the area of the ShapeTuple object 214.

Block 604 is a decision block that represents the computer 100 determining whether the ShapeTuple object 214 is a carryover from another page. If so, control transfers to Block 606 which represents the jumped item placement function described in FIG. 7 and then to Block 608 which terminates the logic of the item placement function. Otherwise, control transfers to Block 610.

Block 610 is a decision block representing the computer 100 determining if the ShapeTuple object 214 can "legally" be placed on the current page, as represented by a Page object 228. If so, control transfers to Block 612; otherwise, control transfers to "A" in FIG. 6B.

Block 612 represents the computer 100 retrieving the origin coordinates (Origincoords) and size coordinates (SizeCoords) associated with the ShapeTuple object 214. Thereafter, control transfers to "B" in FIG. 6D.

Figure 6A:
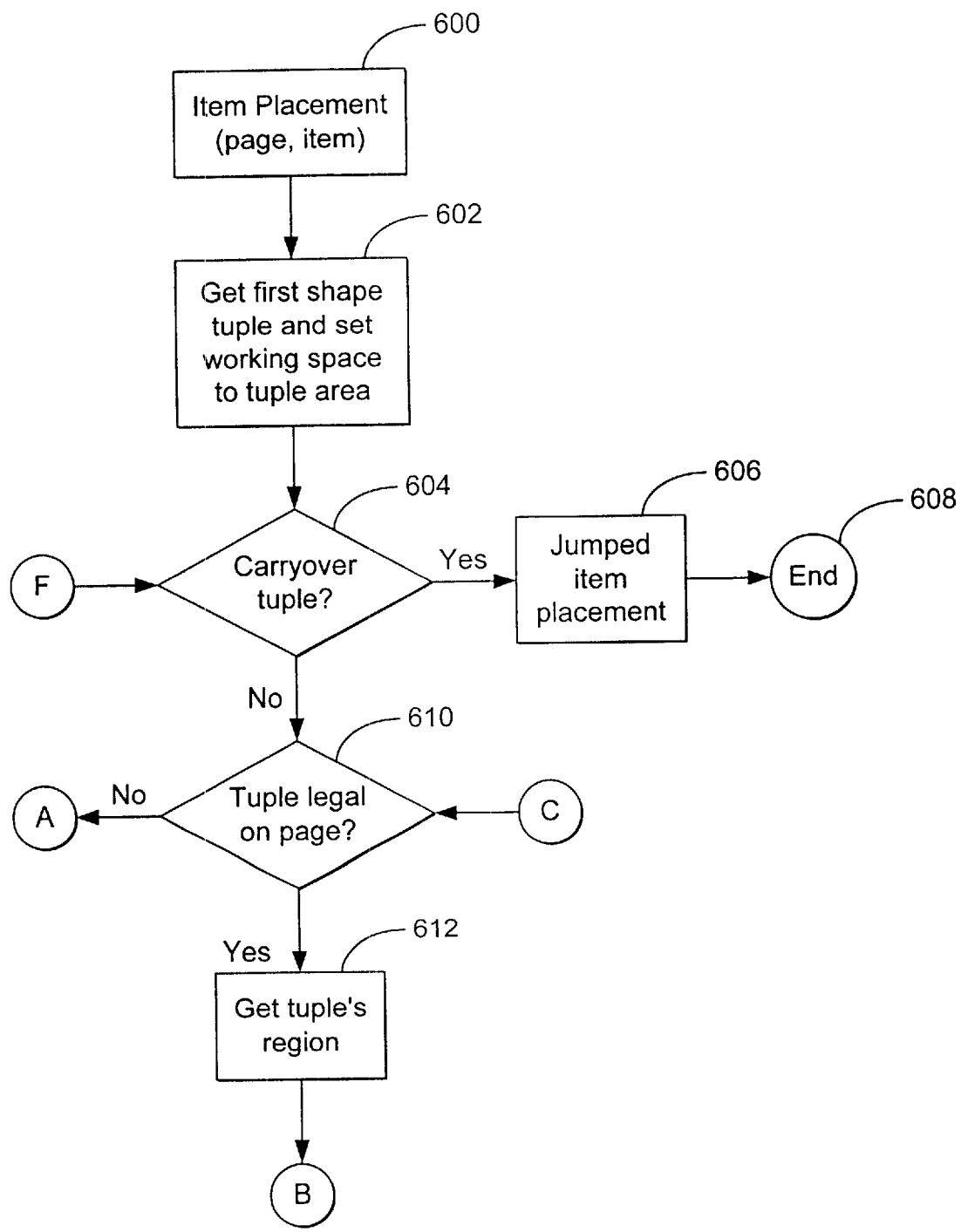
FIGS. 6A–6D together are a flowchart illustrating the item placement function according to the present invention.
Figure 6B:
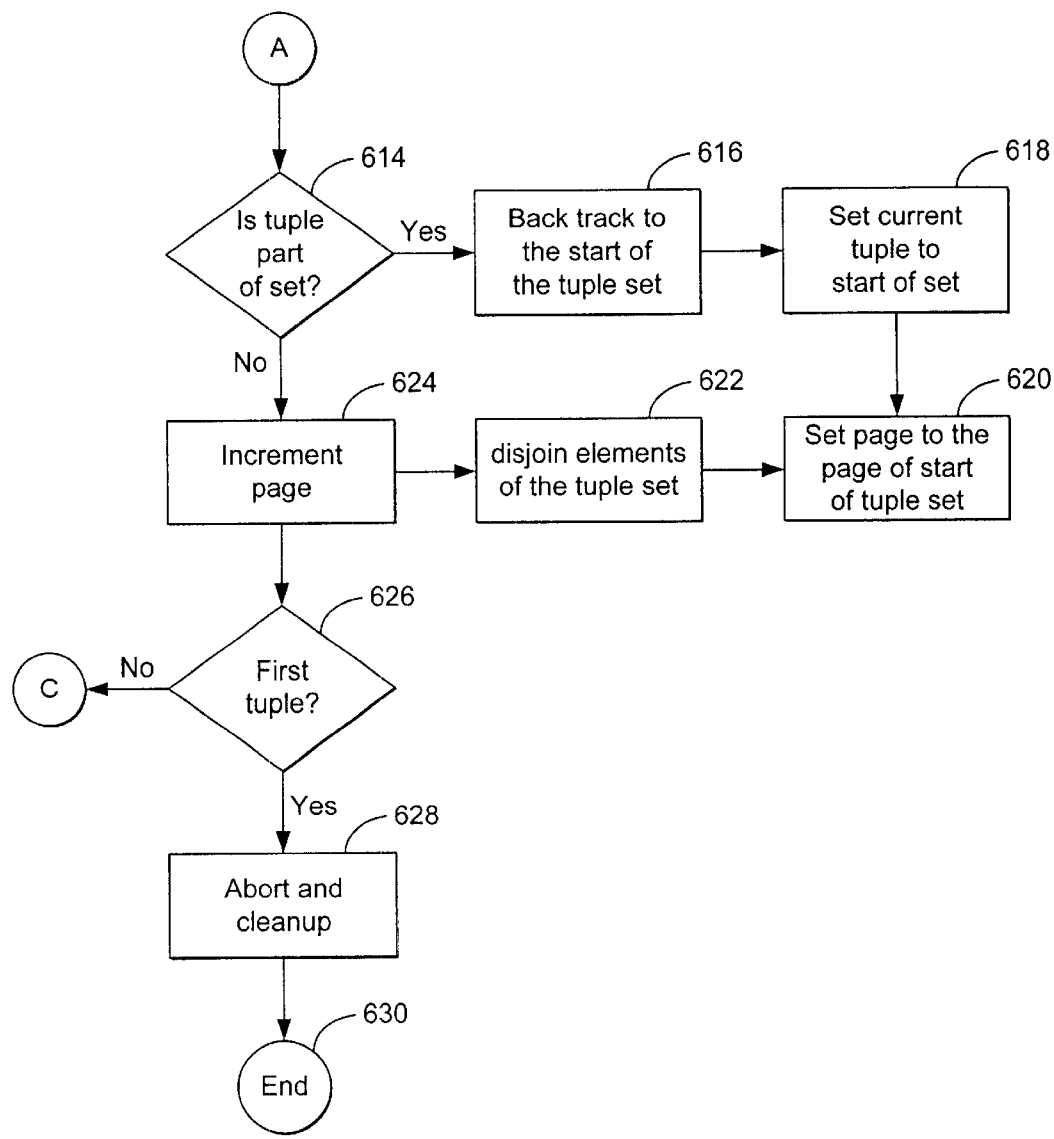

Referring now to FIG. 6B, control is transferred to Block 614 via "A" in FIG. 6A. Block 614 is a decision block that represents the computer 100 determining whether the ShapeTuple object 214 is part of a set. If so, control transfers to Block 616; otherwise, control transfers to Block 624.

Block 616 represents the computer 100 traversing through the set of ShapeTuple objects 214 to the start of the set.

Block 618 represents the computer 100 setting the current ShapeTuple object 214 to the start of the set.

Block 620 represents the computer 100 setting the current page to the page of the start of the set of ShapeTuple objects 214.

Block 622 represents the computer 100 disjoining the elements in the set of the ShapeTuple objects 214.

Block 624 represents the computer 100 incrementing the current page number.

Block 626 is a decision block that represents the computer 100 determining if the ShapeTuple object 214 is a first one of a set. If not, control transfers to "C" in FIG. 6A; otherwise, control transfers to Block 628.

Block 628 represents the computer 100 aborting and cleaning up the item placement function.

Block 630 represents the computer 100 terminating the logic of the item placement function.

Figure 6C:
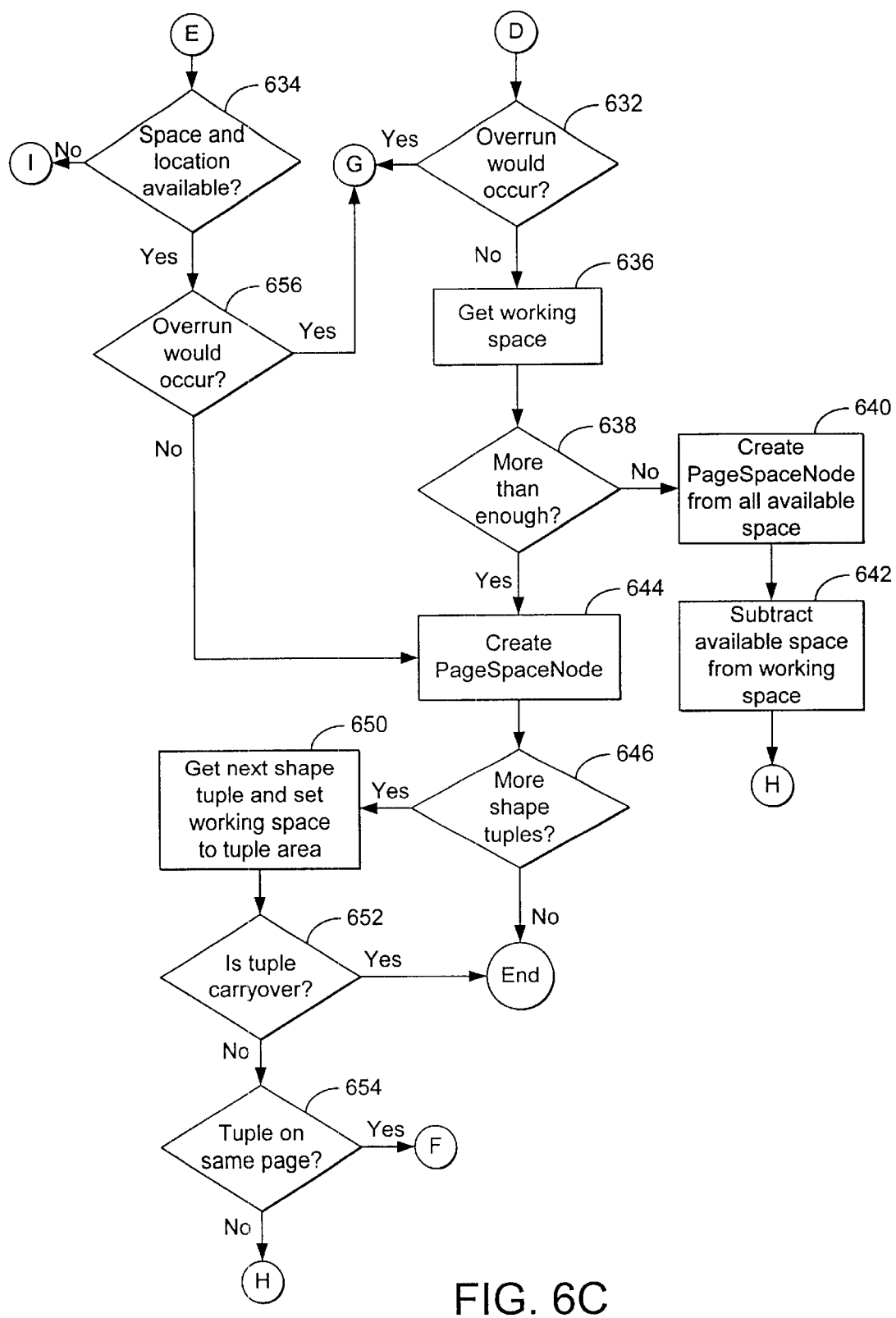

Referring now to FIG. 6C, Block 632 represents the computer 100 determining whether a overrun would occur on the current page, as represented by a Page object 228, from the placement of the ShapeTuple object 214. If so, control transfers to "G" in FIG. 6D; otherwise, control transfers to Block 636.

Block 636 represents the computer 100 determining the working space and allocating memory for the working space.

Block 638 represents the computer 100 determining whether there is more than enough working space. If not, control transfers to Block 640; otherwise, control transfers to Block 642.

Block 640 represents the computer 100 creating a PageSpaceNode object 216 from the available space.

Block 642 represents the computer 100 subtracting the available space from the working space. Thereafter, control transfers to "H" in FIG. 6C.

Block 644 represents the computer 100 creating a PageSpaceNode object 216. Block 646 is a decision block that represents the computer 100 determining if there are more ShapeTuple objects 214 in the set. If not, control transfers to Block 648, which terminates the logic of the function; otherwise, control transfers to Block 650.

Block 650 represents the computer 100 retrieving the next ShapeTuple object 214 and setting the working space to the area in the ShapeTuple object 214.

Block 652 is a decision block that represents the computer determining whether there is carryover for the current page, as represented by a Page object 228. If so, control transfers to Block 648, which terminates the logic of the function; otherwise, control transfers to Block 654.

Block 654 is a decision block that represents the computer 100 determining whether the ShapeTuple object 214 is on the same page, as represented by a Page object 228. If so, control transfers to "F" in FIG. 6A; otherwise, control transfers to "H" in FIG. 6D.

Block 634 is a decision block that represents the computer 100 determining whether the desired space and location, as identified by the origin coordinates (originCoords), size coordinates (SizeCoords), and area in the ShapeTuple object 214, are available. If not, control transfers to "I" in FIG. 6D; otherwise, control transfers to Block 656.

Block 656 is a decision block that represents the computer 100 determining whether an overrun would occur on the current page, as represented by a Page object 228, from the placement of the ShapeTuple object 214. If so, control transfers to "G" in FIG. 6D; otherwise, control transfers to Block 644.

Figure 6D:
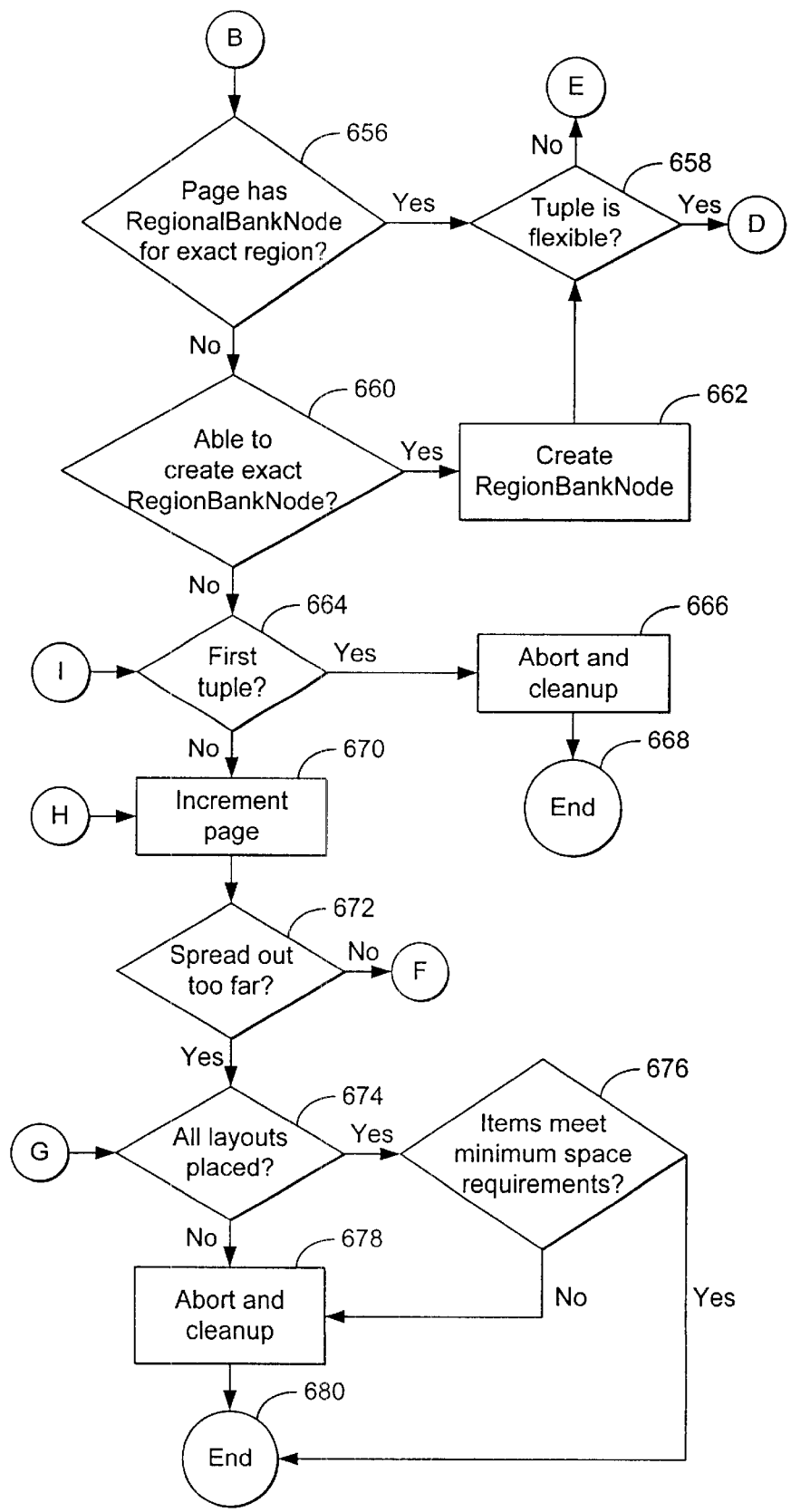

Referring to FIG. 6D, Block 656 is a decision block that represents the computer 100 determining whether the current page, as represented by the Page object 228, has a RegionalBankNode object 230 for the exact Region object 256. If so, control transfers to Block 658; otherwise, control transfers to Block 660.

Block 658 is a decision block that represents the computer 100 determining whether the ShapeTuple object 214 is flexible. If so, control is transferred to "D" in FIG. 6C; otherwise, control is transferred to "E" in FIG. 6C.

Block 660 is a decision block that represents the computer 100 determining whether it is able to create an exact RegionBankNode object 230. If so, control is transferred to Block 662; otherwise, control is transferred to Block 664.

Block 662 represents the computer 100 creating the RegionalBankNode object 230.

Block 664 is a decision block that represents the computer 100 determining whether the ShapeTuple object 214 is the first of a set. If so, control is transferred to Block 666, which aborts the item placement function and cleans up as required, and the to Block 668, which terminates the logic of the item placement function; otherwise, control transfers to Block 670.

Block 670 represents the computer 100 incrementing the current page number.

Block 672 is a decision block that represents the computer 100 determining whether the ShapeTuple object 214 is spread out too far in the publication layout. If not, control is transferred to "F" in FIG. 6A; otherwise, control is transferred to Block 674.

Block 674 is a decision block that represents the computer 100 determining whether all PlaceableItem objects 210 have been placed. If so, control transfers to Block 676; otherwise, control transfers to Block 676; otherwise, control transfers to Block 678.

Block 676 is a decision block that represents the computer 100 determining whether the PlaceableItem objects 210 meet the minimum space requirements. If not, control transfers to Block 678; otherwise, control transfers to Block 680.

Block 678 aborts the item placement function logic and performs any necessary cleanup.

Block 680 terminates the logic of the item placement function.

JUMPED ITEM PLACEMENT

Figure 7:
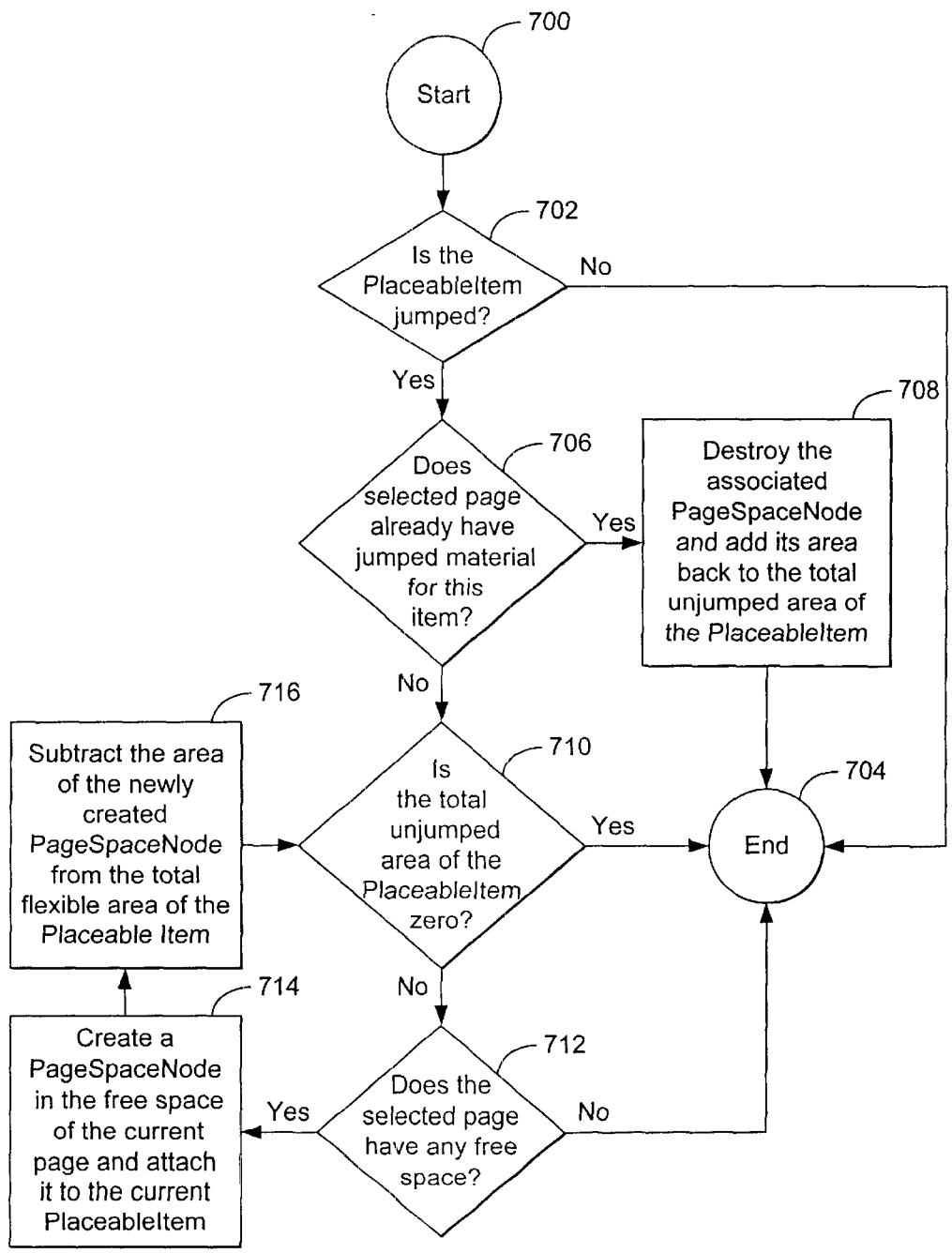
FIG. 7 is a flowchart illustrating the jumped item placement function according to the present invention.

FIG. 7 is a flowchart illustrating the jumped item placement function according to the present invention. Those skilled in the art will recognize that this example logic is not intended to imply any specific functional limits, and that other similar logic could be used to accomplish the present invention.

Block 700 represents the start up of the logic, wherein the function is invoked at Block 606 in FIG. 6A.

Block 702 is a decision block that represents the computer 100 determining whether the PlaceableItem object 210 is jumped. If so, control transfers to Block 704, which represents the computer 100 terminating the jumped item placement logic; otherwise, control transfers to Block 706.

Block 706 is a decision block that represents the computer 100 determining whether the current page, as represented by a Page object 228, already contains jumped material for this PlaceableItem object 210. If so, control transfers to Block 708; otherwise, control transfers to Block 710.

Block 708 represents the computer 100 destroying the associated PageSpaceNode object 216 and adding its area back to the total area of the associated ShapeTuple object 214. Thereafter, control transfers to Block 704.

Block 710 is a decision block that represents the computer 100 determining whether the total unjumped area of the PlaceableItem object 219 is zero. If so, control transfers to Block 704; otherwise, control transfers to Block 712.

Block 712 is a decision block that represents the computer 100 determining whether the current page, as represented by a Page object 228, has any free space. If not, control transfers to Block 704; otherwise, control transfers to Block 714.

Block 714 represents the computer 100 creating a PageSpaceNode object 216 in the free space of the current Page object 228 and attaching it to the current PlaceableItem object 210.

Block 716 represents the computer 100 subtracting the area of the newly created PageSpaceNode object 216 from the total flexible area of the PlaceableItem object 210. Thereafter, control transfers back to Block 710.

CONFLICT CHECKING

Figure 8:
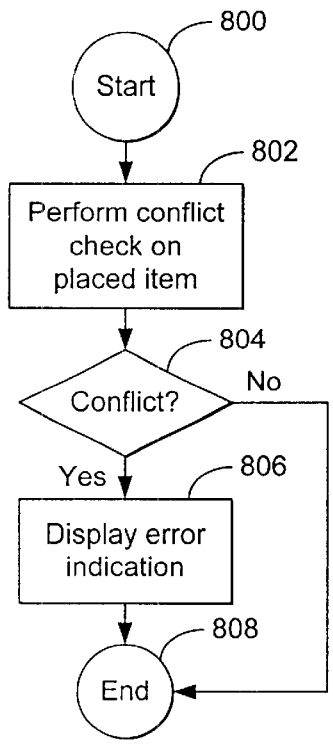
FIG. 8 is a flowchart illustrating the conflict checking function according to the present invention.

FIG. 8 is a flowchart illustrating the conflict checking function according to the present invention. Those skilled in the art will recognize that this example logic is not intended to imply any specific functional limits, and that other similar logic could be used to accomplish the present invention.

Block 800 represents the start of the logic, wherein the function is invoked at Block 504 in FIG. 5.

Block 802 represents the computer 100 performing a conflict check as the PlaceableItem object 210 is placed in the publication layout. The conflict check will determine whether there is any mismatch in attributes and requirements between the PlaceableItem object 210 and other objects in the database.

Block 804 is a decision block that represents the computer 100 determining whether a conflict occurred. If so, control is transferred to Block 806; otherwise, control is transferred to Block 808.

Block 806 represents the computer 100 displaying an error indication when a conflict occurs between the PlaceableItem object and its proposed placement in the publication layout. In the preferred embodiment, the error indication for the conflict check is a stop sign displayed on the monitor overlaying the PlaceableItem object 210 or other object whose attribute has been violated.

Block 808 represents the computer 100 terminating the conflict checking logic.

COST CALCULATION

Figure 9:
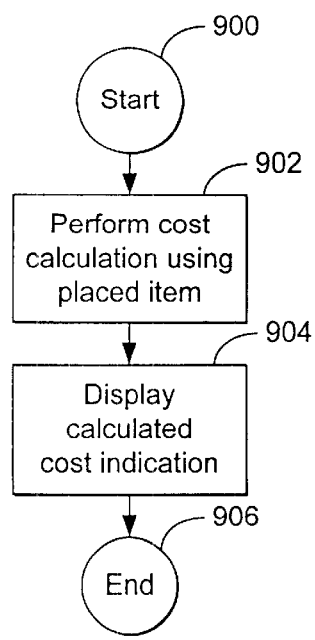
FIG. 9 is a flowchart illustrating the cost calculation function according to the present invention.

FIG. 9 is a flowchart illustrating the cost calculation function according to the present invention. Those skilled in the art will recognize that this example logic is not intended to imply any specific functional limits, and that other similar logic could be used to accomplish the present invention.

Block 900 represents the start of the logic, wherein the function is invoked at Block 504 in FIG. 5.

Block 902 represents the computer 100 performing a cost calculation of the publication layout.

Block 904 represents the computer 100 displaying an indication of the calculated cost. In the preferred embodiment, the error indication for the conflict check is an odometer metaphor displayed on the monitor.

Block 906 represents the computer 100 terminating the cost calculation logic.

WEB COLOR FIT

Figure 10:
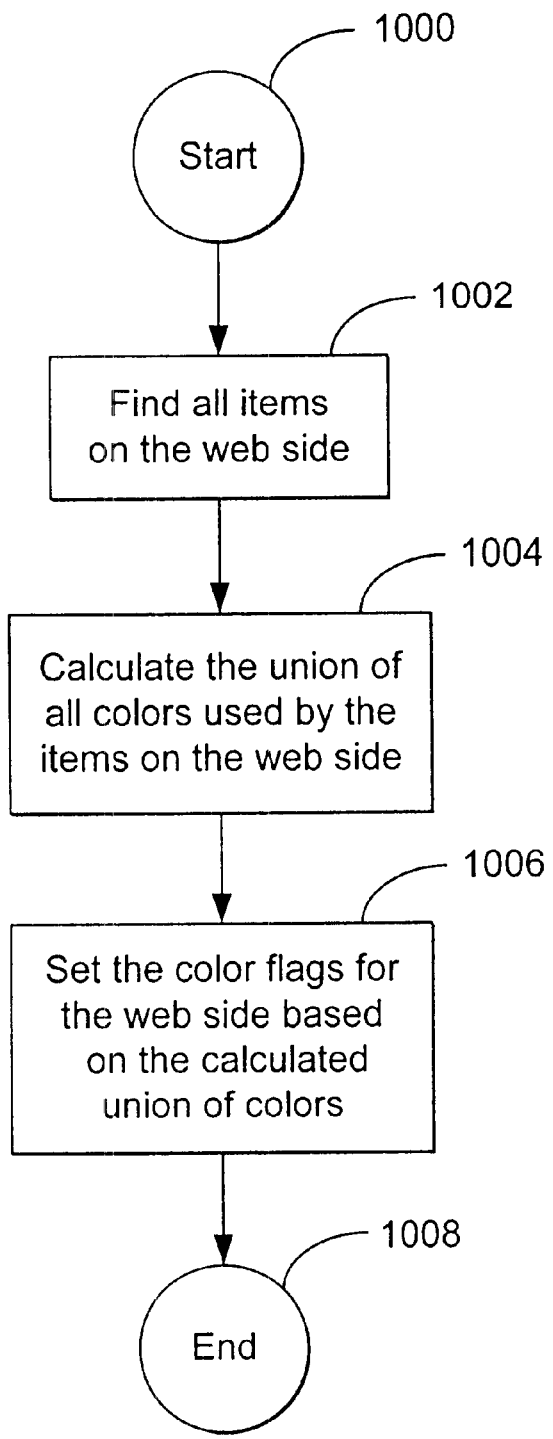
FIG. 10 is a flowchart illustrating the web color fit function according to the present invention.

FIG. 10 is a flowchart illustrating the web color fit function according to the present invention. Those skilled in the art will recognize that this example logic is not intended to imply any specific functional limits, and that other similar logic could be used to accomplish the present invention.

Block 1000 represents the start up logic, wherein the function is invoked at Block 508 in FIG. 5.

Block 1002 represents the computer 100 finding all PlaceableItem objects 210 associated with the side indicated in the Web object 224.

Block 1004 represents the computer 100 calculating the union of all colors used by the PlaceableItem objects 210 on the Web object 224 side.

Block 1006 represents the computer 100 setting the color flags for the Web object 224 side based on the calculating union of colors.

Block 1008 represents the computer 100 terminating the Web color fit logic.

SIGNATURE SPLIT/EPOXY

Figure 11:
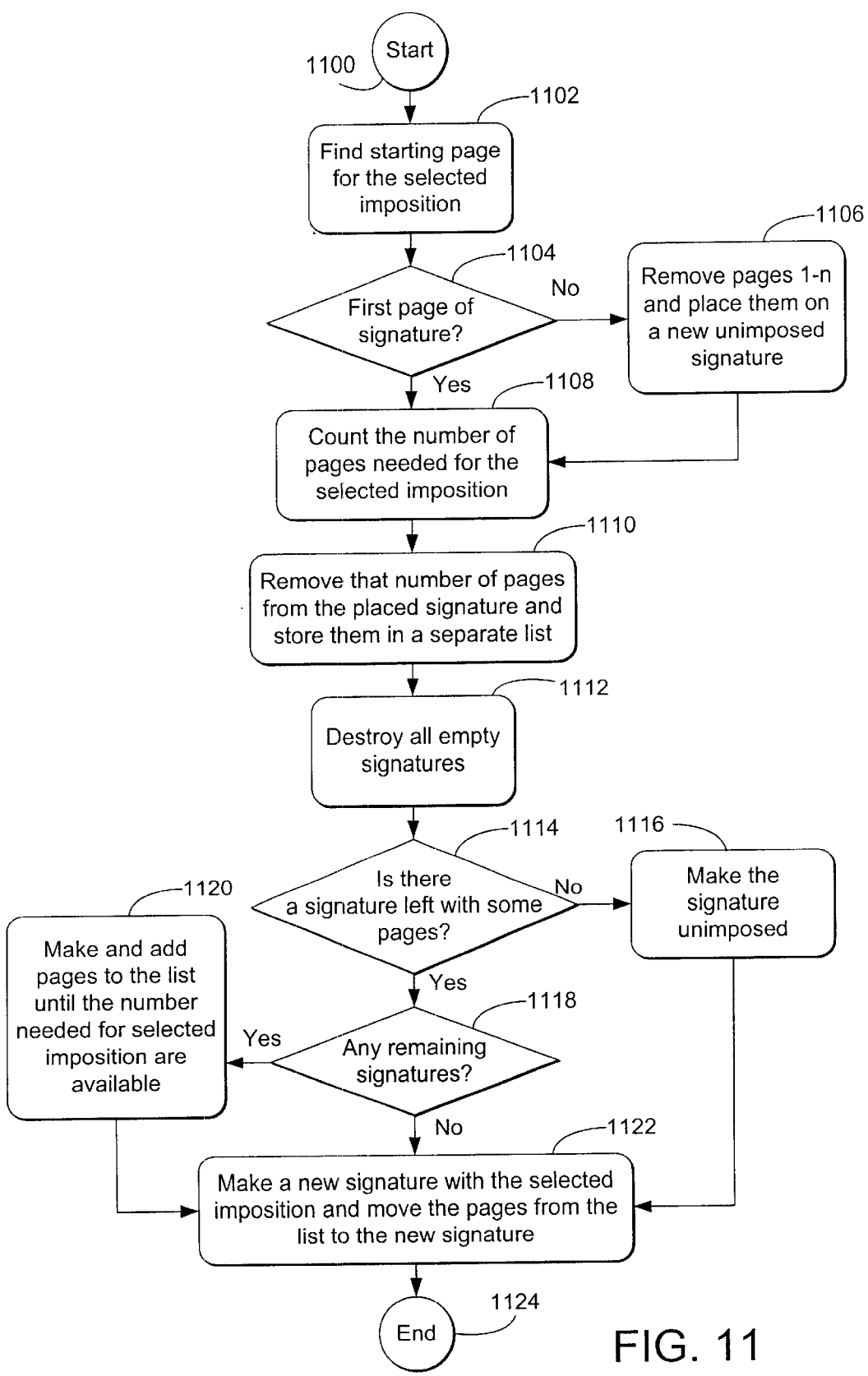
FIG. 11 is a flowchart illustrating the signature split/epoxy function according to the present invention.

FIG. 11 is a flowchart illustrating the signature split/epoxy function according to the present invention. Those skilled in the art will recognize that this example logic is not intended to imply any specific functional limits, and that other similar logic could be used to accomplish the present invention.

Block 1100 represents the start of the logic, wherein the function is invoked at Block 508 in FIG. 5.

Block 1102 represents the computer 100 finding the starting Page object 220 for the selected Imposition object 226.

Block 1104 is a decision block that represents the computer 100 determining whether the starting Page object 228 is the first Page object 228 of a Signature object 222. If not, control transfers to Block 1106; otherwise, control transfers to Block 1108.

Block 1106 represents the computer 100 removing the Page objects 228 and placing them on a new unimposed Signature object 222.

Block 1108 represents the computer 100 counting the number of Page objects 228 needed for the selected Imposition object 226.

Block 1110 represents the computer 100 removing that number of Page objects 228 from Signature object 222 and storing them in a separate list.

Block 1112 represents the computer 100 destroying all empty Signature objects 222.

Block 1114 is a decision block that represents the computer 100 determining whether there is a Signature object 222 left with some Page objects 228. If so, control transfers to Block 1116; otherwise, control transfers to Block 1118.

Block 1116 represents the computer 100 making the Signature object 222 unimposed.

Block 1118 is a decision block that represents the computer 100 determining whether there are any remaining Signature objects 222. If so, control transfers to Block 1120; otherwise, control transfers to Block 1122.

Block 1120 represents the computer 100 making and adding Page objects 228 to the list until the number needed for the selected Imposition object 226 are available.

Block 1122 represents the computer 100 making a new Signature object 222 with a selected Imposition object 226 and moving the Page objects 228 from the list to the new Signature object 222.

Block 1124 represents the computer 100 terminating the signature split/epoxy function.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a publication layout using a computer having a memory and a monitor, the method comprising:
   (a) creating a data structure in the computer representing a publication layout;
   (b) creating a data structure in the computer representing items to be placed in the publication layout;
   (c) optimizing, in the computer, the placement of the items in the publication layout, wherein the optimizing step further comprises the steps of comparing attributes of the items to attributes of the publication layout, and providing an optimal mix of the attributes for the items as compared to the attributes of the publication layout; and
   (d) performing, in the computer, conflict checking as items are placed in the publication layout, wherein the performing step comprises displaying an error indication when a mismatch occurs between an attribute of an item and an attribute of the layout or an attribute of another item in the layout, wherein the error indication for the conflict check is a stop sign displayed on the monitor overlaying the item whose attribute has been violated.

2. A method of optimizing a publication layout using a computer having a memory and a monitor, the method comprising:
   (a) creating a data structure in the computer representing a publication layout;
   (b) creating a data structure in the computer representing items to be placed in the publication layout;
   (c) optimizing, in the computer, the placement of the items in the publication layout, wherein the optimizing step further comprises the steps of comparing attributes of the items to attributes of the publication layout, and providing an optimal mix of the attributes for the items as compared to the attributes of the publication layout;
   (d) performing, in the computer, conflict checking as items are placed in the publication layout, wherein the performing step comprises displaying an error indication when a mismatch occurs between an attribute of an item and an attribute of the layout or an attribute of another item in the layout; and
   (e) calculating a cost for the publication layout as the items are being placed therein and displaying an indication of the calculated cost.

3. The method of claim 2 above, wherein the indication of the calculated cost comprises an odometer metaphor displayed on the monitor.

4. An apparatus for optimizing a publication layout, comprising:
   (a) a computer;
   (b) means, performed by the computer, for creating a data structure representing a publication layout,
   (c) means, performed by the computer, for creating a data structure representing items to be placed in the publication layout;
   (d) means, performed by the computer, for optimizing the placement of the items in the publication layout, wherein the optimizing step further comprises the steps of comparing attributes of the items to attributes of the publication layout, and providing an optimal mix of the attributes for the items as compared to the attributes of the publication layout; and
   (e) means, performed by the computer, for performing conflict checking as items are placed in the publication layout, wherein the performing step comprises displaying an error indication when a mismatch occurs between an attribute of an item and an attribute of the layout or an attribute of another item in the layout, wherein the error indication for the conflict check is a stop sign displayed on the monitor overlaying the item whose attribute has been violated.

5. An apparatus for optimizing a publication layout, comprising:
   (a) a computer;
   (b) means, performed by the computer, for creating a data structure representing a publication layout,
   (c) means, performed by the computer, for creating a data structure representing items to be placed in the publication layout;
   (d) means, performed by the computer, for optimizing the placement of the items in the publication layout, wherein the optimizing step further comprises the steps of comparing attributes of the items to attributes of the publication layout, and providing an optimal mix of the attributes for the items as compared to the attributes of the publication layout; and
   (e) means, performed by the computer, for performing conflict checking as items are placed in the publication layout, wherein the performing step comprises displaying an error indication when a mismatch occurs between an attribute of an item and an attribute of the layout or an attribute of another item in the layout; and
   (f) means for calculating a cost for the publication layout as the items are being placed therein and displaying an indication of the calculated cost.

6. The apparatus of claim 5 above, wherein the indication of the calculated cost comprises an odometer metaphor displayed on the monitor.

7. An article of manufacture comprising a computer instruction carrier, readable by a computer, tangibly embodying one or more instructions executable by the computer to perform a method of optimizing a publication layout, the method comprising:
   (a) creating a data structure in the computer representing a publication layout;
   (b) creating a data structure in the computer representing items to be placed in the publication layout;
   (c) optimizing, in the computer, the placement of the items in the publication layout, wherein the optimizing step further comprises the steps of comparing attributes of the items to attributes of the publication layout, and providing an optimal mix of the attributes for the items as compared to the attributes of the publication layout; and
   (d) performing conflict checking as items are placed in the publication layout, wherein the performing step comprises displaying an error indication when a mismatch occurs between an attribute of an item and an attribute of the layout or an attribute of another item in the layout, wherein the error indication for the conflict check is a stop sign displayed on the monitor overlaying the item whose attribute has been violated.

8. An article of manufacture comprising a computer instruction carrier, readable by a computer, tangibly embodying one or more instructions executable by the computer to perform a method of optimizing a publication layout, the method comprising:

(a) creating a data structure in the computer representing a publication layout;

(b) creating a data structure in the computer representing items to be placed in the publication layout;

(c) optimizing, in the computer, the placement of the items in the publication layout, wherein the optimizing step further comprises the steps of comparing attributes of the items to attributes of the publication layout, and providing an optimal mix of the attributes for the items as compared to the attributes of the publication layout; and (d) performing conflict checking as items are placed in the publication layout, wherein the performing step comprises displaying an error indication when a mismatch occurs between an attribute of an item and an attribute of the layout or an attribute of another item in the layout; and (e) calculating a cost for the publication layout as the items are being placed therein and displaying an indication of the calculated cost.

9. The method of claim 8 above, wherein the indication of the calculated cost comprises an odometer metaphor displayed on the monitor.

* * * * *